US012162286B2

(12) United States Patent
Matsumura et al.

(10) Patent No.: US 12,162,286 B2
(45) Date of Patent: Dec. 10, 2024

(54) RECORDING APPARATUS

(71) Applicant: CANON KABUSHIKI KAISHA, Tokyo (JP)

(72) Inventors: Hideaki Matsumura, Tokyo (JP); Koya Iwakura, Kanagawa (JP); Tetsu Hamano, Tokyo (JP); Nobuhiro Toki, Kanagawa (JP); Fumie Kameyama, Tokyo (JP); Koki Shimada, Kanagawa (JP); Shota Asada, Tokyo (JP); Ken Takenaga, Kanagawa (JP); Yusuke Tanaka, Kanagawa (JP); Yuta Araki, Chiba (JP); Taiji Maruyama, Kanagawa (JP); Atsushi Matsuyama, Kanagawa (JP); Yusuke Naratani, Tokyo (JP); Kousuke Tanaka, Kanagawa (JP); Shimpei Fujisaki, Tokyo (JP); Hiromasa Tsutsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 17/934,503

(22) Filed: Sep. 22, 2022

(65) Prior Publication Data

US 2023/0094421 A1 Mar. 30, 2023

(30) Foreign Application Priority Data

Sep. 28, 2021 (JP) ................................ 2021-158442

(51) Int. Cl.
*B41J 2/165* (2006.01)

(52) U.S. Cl.
CPC ....... *B41J 2/16544* (2013.01); *B41J 2/16511* (2013.01); *B41J 2/16523* (2013.01); *B41J 2/16514* (2024.05)

(58) Field of Classification Search
CPC ................ B41J 2/16544; B41J 2/16511; B41J 2/16523; B41J 2002/16514;
(Continued)

(56) References Cited

U.S. PATENT DOCUMENTS 5,670,997 A 9/1997 Sugimoto
2002/0105560 A1* 8/2002 Shimizu ............... B41J 2/16538 347/29

(Continued)

FOREIGN PATENT DOCUMENTS

JP 2011-121269 A 6/2011
JP 2018-024150 A 2/2018

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A recording apparatus includes a recording head having discharge orifices arranged on a discharge orifice surface, a cap, a wiper, and a moving unit that moves the wiper in a first direction. When the cap covers the discharge orifice surface, a first member is disposed at an inside wall of the cap at a position near a first side of a region having the discharge orifices, and a second member is disposed at another inside wall of the cap at a position near a second side of the region having the discharge orifices. The first side faces in a direction opposite to the first direction and the second side faces in the first direction. In a direction normal to the discharge orifice surface, a distance between the second member and the discharge orifice surface is smaller than a distance between the first member and the discharge orifice surface.

18 Claims, 13 Drawing Sheets

(58) Field of Classification Search
CPC .......... B41J 2002/16573; B41J 2/16532; B41J 2/16538; B41J 2/16508
USPC .......................................................... 347/33
See application file for complete search history.

(56) References Cited

U.S. PATENT DOCUMENTS

| | | | | |
|---|---|---|---|---|
| 2002/0130920 | A1 * | 9/2002 | Saijo .................... | B41J 2/16547 347/31 |
| 2002/0196307 | A1 * | 12/2002 | Arakawa .............. | B41J 2/16547 347/33 |
| 2008/0116992 | A1 | 5/2008 | Kishigami | |

* cited by examiner

RECORDING APPARATUS

BACKGROUND

Field

The present disclosure relates to a recording apparatus.

Description of the Related Art

A known ink jet recording apparatus sucks ink from ink discharge orifices to remove, for example, clogging of the discharge orifices and subsequently wipes the surface at which the discharge orifice are arranged. Residual ink remaining on the discharge orifice surface after the suction of the ink from the discharge orifices may lead to defective discharge, such as ink discharge in wrong directions or inability to discharge ink.

U.S. Pat. No. 5,670,997 discloses a recording apparatus that performs a suction operation in the following manner in order to reduce the occurrence of ink adhesion to a discharge orifice surface. The recording apparatus performs a first suction operation and subsequently moves a carriage slightly to detach a closely adhered cap slightly from the discharge orifice surface and thereby form a partial gap therebetween. In this state, the recording apparatus performs a second suction operation.

Other recording apparatuses may have a type of recording head where a step portion on the discharge orifice surface at a position at which the discharge orifices are not formed. In this type of recording head, ink may move over the discharge orifice surface during the suction operation and stay at the step portion. During the wiping operation, the wiper comes into contact with the step portion and may draw the ink therefrom.

SUMMARY

The present disclosure provides a recording apparatus that can reduce the likelihood that the ink accumulating at the step portion on the discharge orifice surface of the recording head adheres to the vicinity of the discharge orifices during the wiping operation.

According to an aspect of the present disclosure, a recording apparatus includes a recording head having a discharge orifice surface at which discharge orifices for discharging ink are arranged, a cap configured to cover the discharge orifice surface, a wiper configured to wipe the discharge orifice surface, and a moving unit configured to move the wiper and the recording head relative to each other in such a manner that the wiper moves relative to the recording head along the discharge orifice surface in a first direction, wherein, when the cap covers the discharge orifice surface, a first member is disposed at an inside wall of the cap at a position near a first side of a region having the discharge orifices in the discharge orifice surface, where the first side faces in a direction opposite to the first direction, wherein, when the cap covers the discharge orifice surface, a second member is disposed at another inside wall of the cap at a position near a second side of the region having the discharge orifices, where the second side faces in the first direction, and wherein, in a direction normal to the discharge orifice surface, a distance between the second member and the discharge orifice surface is smaller than a distance between the first member and the discharge orifice surface.

Further features of the present disclosure will become apparent from the following description of exemplary embodiments with reference to the attached drawings.

DESCRIPTION OF THE EMBODIMENTS

Figure 1:
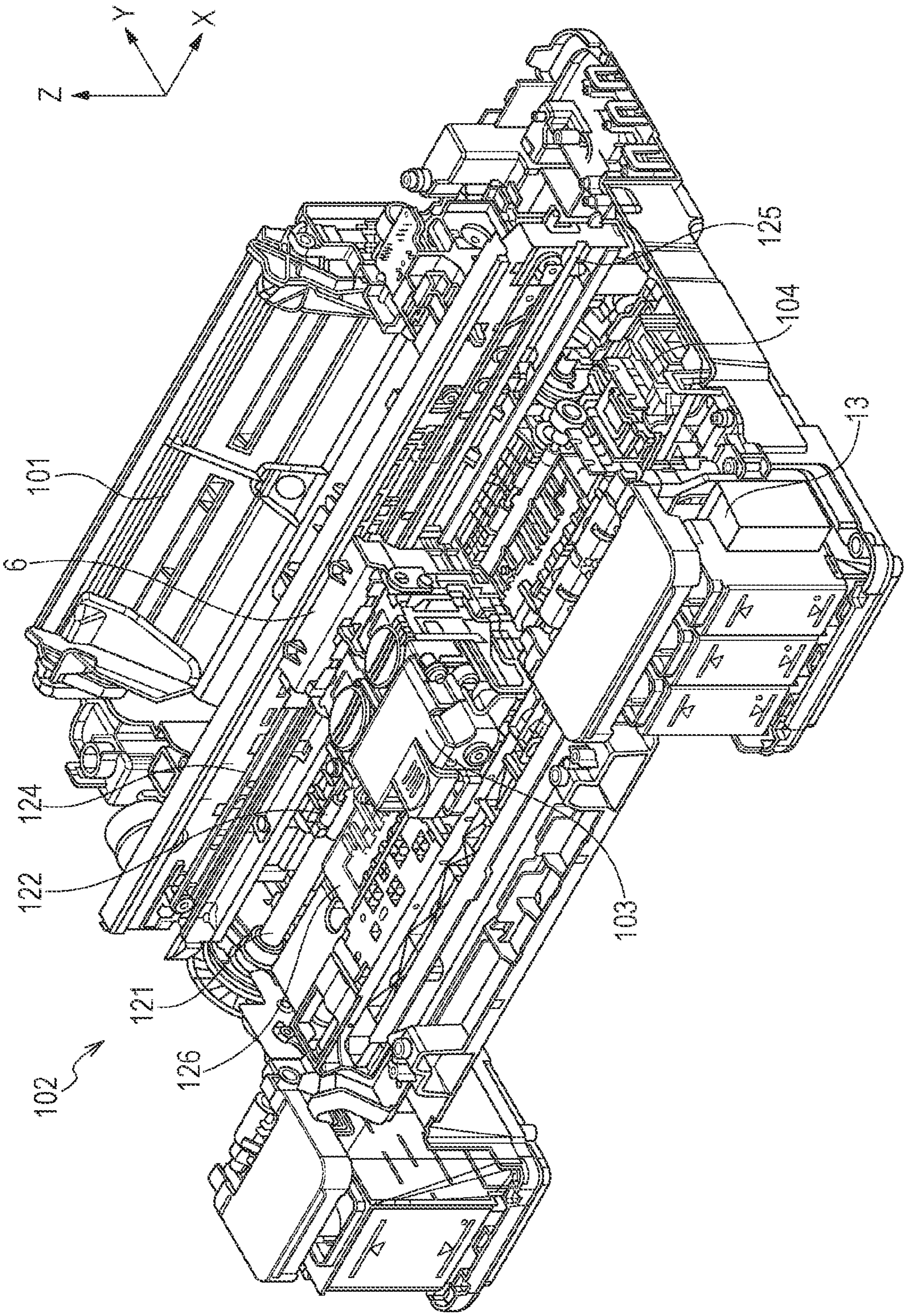
FIG. 1 is a perspective view illustrating an internal structure of an ink jet recording apparatus according to an embodiment.

Embodiments of the present disclosure will be described specifically with reference to the drawings. Note that in the drawings, like elements are denoted by like reference signs.

General View of Ink Jet Recording Apparatus

FIG. 1 is a perspective view illustrating an internal structure of an ink jet recording apparatus 1 according to an embodiment.

As illustrated in FIG. 1, the ink jet recording apparatus 1 (also referred to simply as "recording apparatus 1") includes a sheet feeding section 101, a conveyance section 102, a recording mechanism section 103, and a recovery mechanism section 104. The sheet feeding section 101 feeds recording media P, such as recording sheets, into the main body of the recording apparatus. The conveyance section 102 conveys each recording medium P supplied from the sheet feeding section 101 in the negative Y direction. The recording mechanism section 103 operates in accordance with image data and records an image on the recording medium P. The recovery mechanism section 104 is provided to maintain or recover ink discharging performance of a recording head.

The recording media P stacked in the sheet feeding section 101 are separated one by one by a sheet feeding roller driven by a feeder-conveyor motor 205 and fed to the conveyance section 102. Each recording medium P fed to the conveyance section 102 is nipped by a pinching roller 122 and a conveyance roller 121 driven by the feeder-conveyor motor 205 and thereby conveyed onto a platen 126.

The recording mechanism section 103 performs recording onto the recording medium P conveyed over the platen 126. In the recording mechanism section 103, a carriage 6 on which a recording head 5 is mounted (see FIG. 3) moves in the main scanning direction (in the X direction). In recording, ink is discharged from discharge orifices of the recording head 5 while the carriage 6 is driven in accordance with the image data. The recording medium P on which recording has been performed is nipped by a spur roller and a sheet discharging roller driven in synchronization with the conveyance roller 121 and is discharged out of the apparatus body.

The recording mechanism section 103 includes the carriage 6 configured to move reciprocally in the main scanning direction (in the X direction) and recording cartridges mounted on the carriage 6. The carriage 6 is held so as to be able to move reciprocally along a guide rail disposed in the apparatus body. A carriage motor 204 reciprocally moves the carriage 6 using a carriage belt 124. An encoder scale 125 is disposed in the apparatus body, and an encoder sensor is mounted on the carriage 6. The encoder sensor thereby detects the position and the velocity of the carriage 6. The reciprocal movement of the carriage 6 is controlled accordingly. In a recording operation, the recording head 5 records one scanning portion of the image on the recording medium P in synchronization with the movement (main scanning) of the carriage 6. After the one scanning portion is recorded, the recording medium P is conveyed by a predetermined pitch (sub scanning). This process is repeated until the recording is completed over the entire recording medium P.

The recovery mechanism section 104 is provided to maintain or recover the quality of recorded images to an appropriate level. The recovery mechanism section 104 removes, for example, clogging of discharge orifices of the recording head 5. The recovery mechanism section 104 mainly includes a wiping mechanism that wipes a discharge orifice surface, a capping mechanism that covers the discharge orifice surface, and a pumping mechanism that draws ink from the discharge orifices. In the present embodiment, the recovery mechanism section 104 also includes a slider 7. The slider 7 is configured to follow the movement of the carriage 6 and move in a predetermined distance when the carriage 6 comes to the recovery mechanism section 104, which will be described later with reference to FIG. 4. Wipers 8 and 9 of the wiping mechanism and caps 1A and 1B of the capping mechanism are mounted on the slider 7.

Block Diagram

Figure 2:
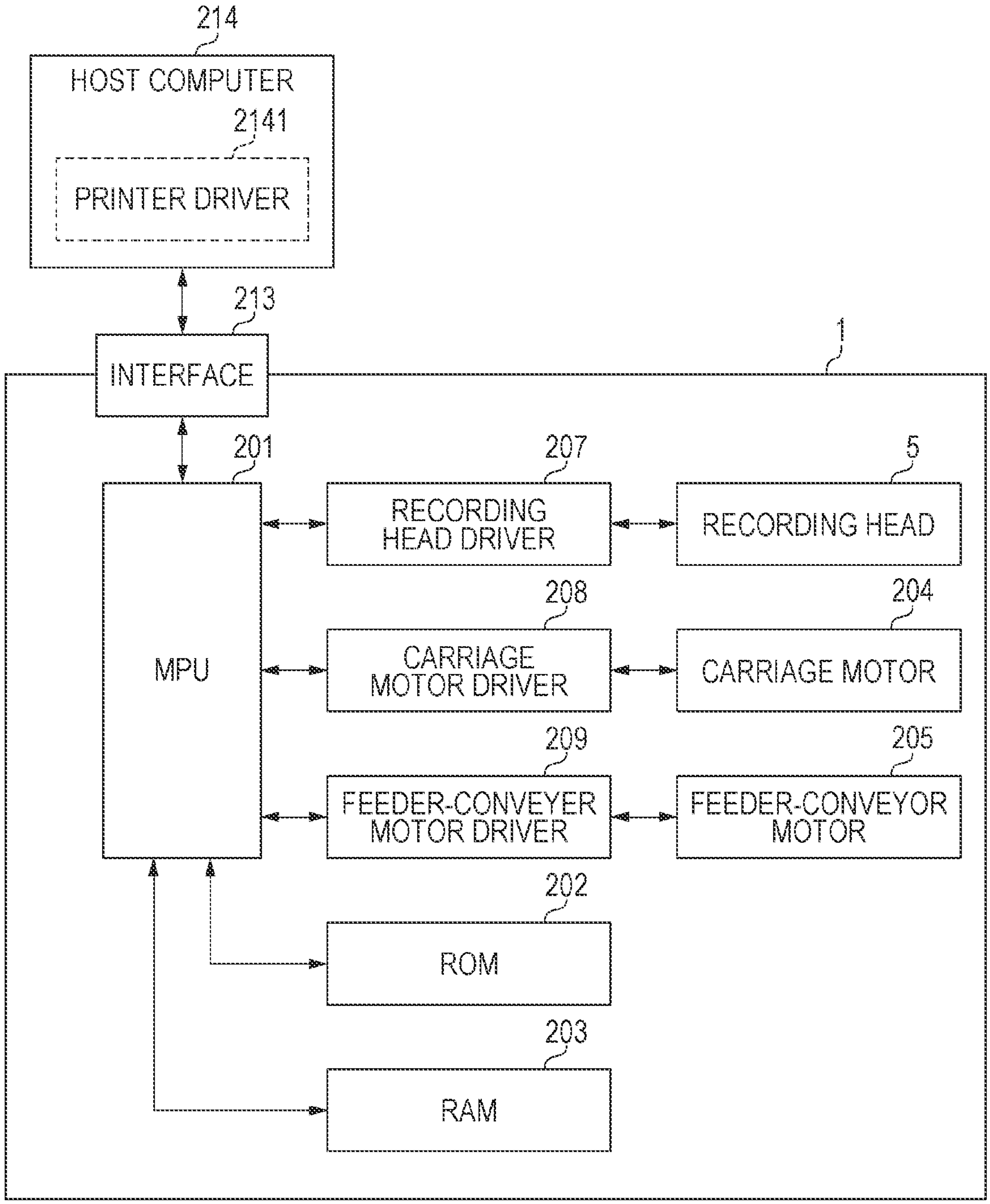
FIG. 2 is a block diagram for the ink jet recording apparatus according to the embodiment.

FIG. 2 is a block diagram for the ink jet recording apparatus of the present embodiment. As illustrated in FIG. 2, reference sign 201 denotes MPU that controls data processing and operation of each section of the recording apparatus 1. Reference sign 202 denotes ROM in which programs to be executed by MPU 201 and data are stored. Reference sign 203 denotes RAM that temporarily stores the data to be processed by MPU 201 as well as the data received from a host computer 214.

A recording head driver 207 controls the recording head 5. A carriage motor driver 208 controls the carriage motor 204 that drives the carriage 6. The feeder-conveyor motor 205 drives the sheet feeding roller 120, the conveyance roller 121, and the sheet discharging roller driven in synchronization with the conveyance roller 121. A feeder-conveyer motor driver 209 controls the feeder-conveyor motor 205.

The host computer 214 has a printer driver 2141 provided for communication with the recording apparatus. The printer driver 2141 sends recording data, such as a recording image and a recording quality instruction, to the recording apparatus. MPU 201 performs communication with the host computer 214 via an interface 213 to obtain, for example, the recording image.

Details of Recording Mechanism Section 103

Figure 3:
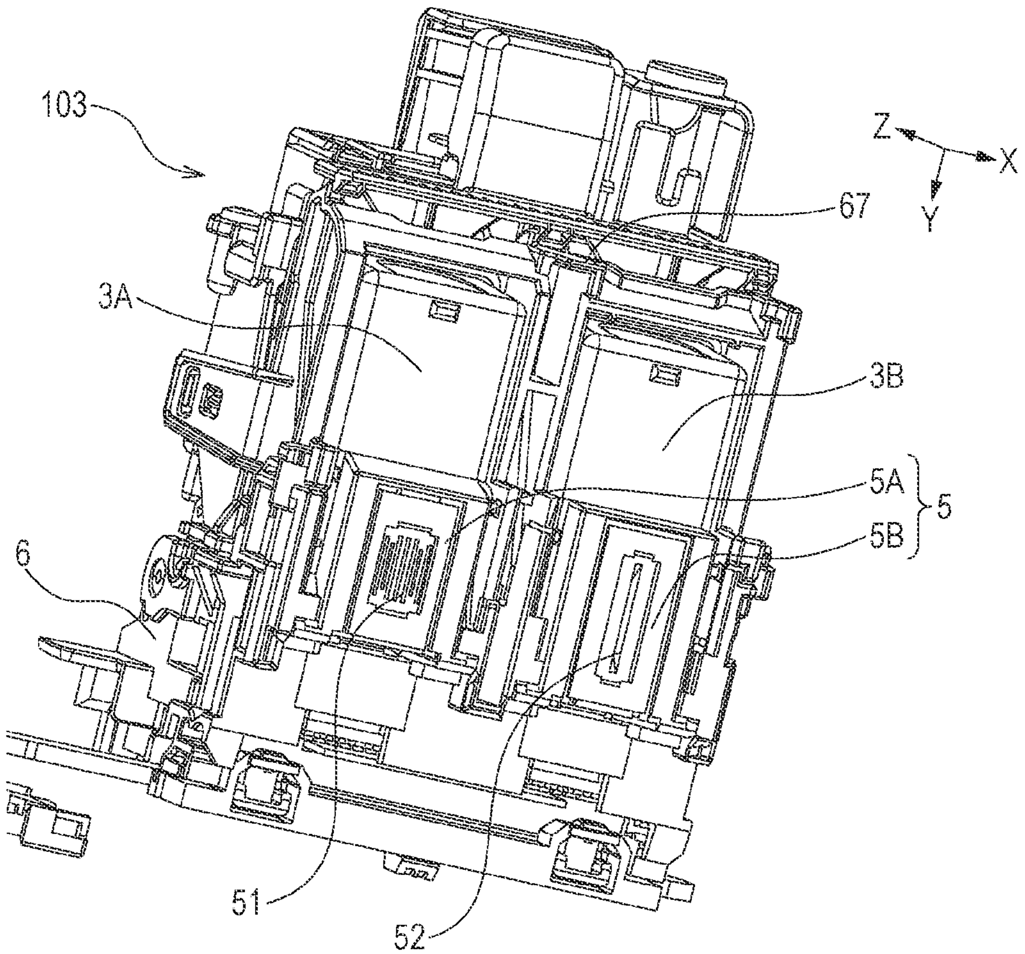
FIG. 3 is a perspective view illustrating a recording mechanism section according to the embodiment.

FIG. 3 is a perspective view illustrating the recording mechanism section 103 of the present embodiment. As illustrated in FIG. 3, the carriage 6 includes two recording cartridges 3A and 3B that are detachably mounted thereon. The recording cartridges 3A and 3B include respective ink cartridges, in which respective recording heads 5A and 5B and ink tanks are formed integrally. The multicolor recording cartridge 3A includes the recording head 5A that can perform recording using multiple color inks. The monochrome recording cartridge 3B includes the recording head 5B that can perform recording using a single color ink (such as a black ink). For example, discharge orifice rows that can discharge cyan, magenta, and yellow inks are formed at a discharge orifice surface 51 of the recording head 5A. A discharge orifice row that can discharge a monochrome ink, such as a black ink, is formed at a discharge orifice surface 52 of the recording head 5B.

Note that the configuration of the discharge orifice rows of the recording head is not limited to this. For example, the recording head 5B may have multiple discharge orifice rows that can discharge different color inks. Moreover, the recording head and the ink tank may be provided separately instead of using the ink cartridge.

Details of Recovery Mechanism Section 104

Figure 4:
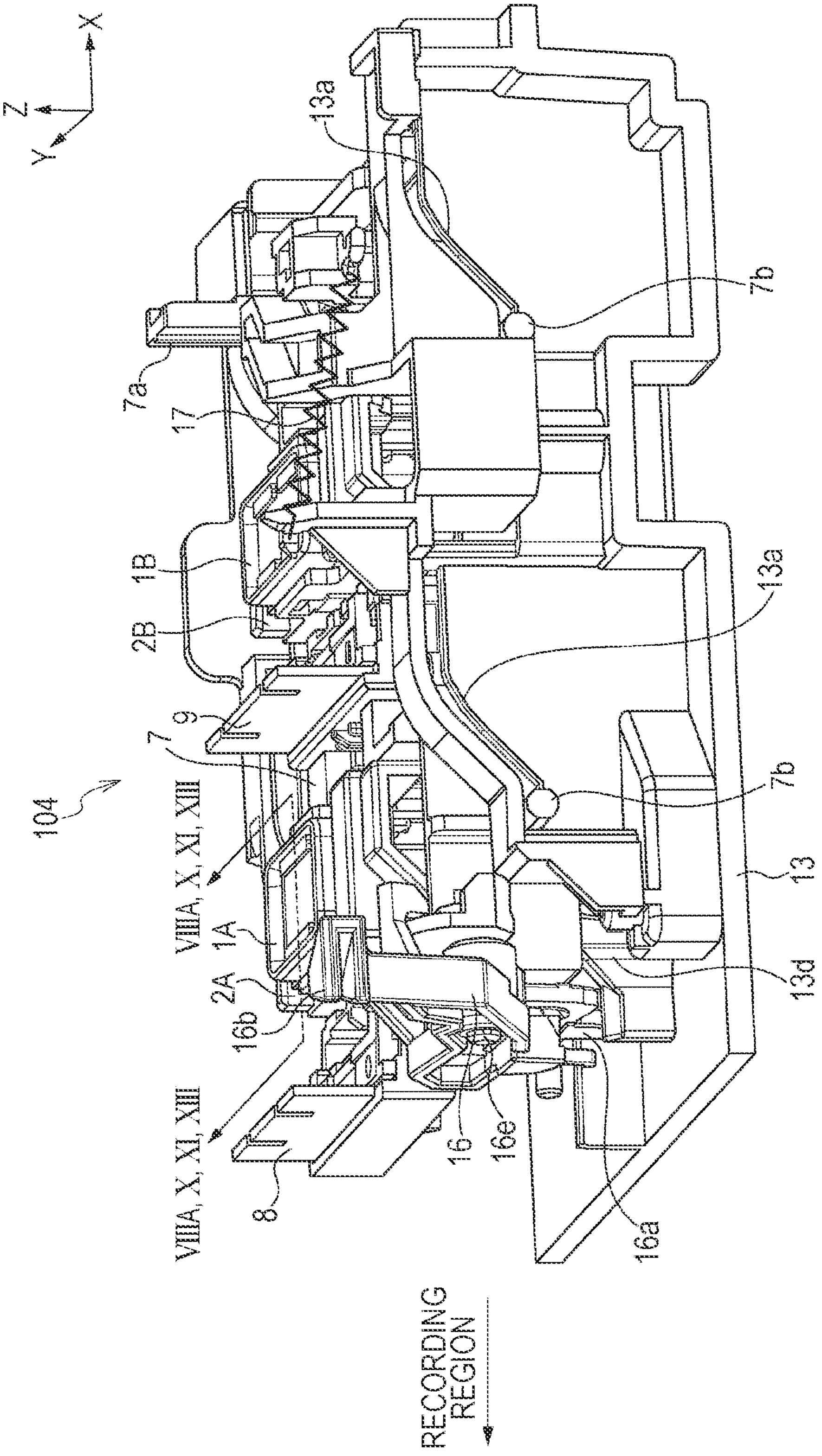
FIG. 4 is a perspective view illustrating a recovery mechanism section according to the embodiment.

FIG. 4 is a perspective view illustrating the recovery mechanism section 104 of the present embodiment. As illustrated in FIG. 4, the slider 7 includes an abutting portion 7*a* that abuts a side wall of the carriage 6 so that the slider 7 can follow the movement of the carriage 6 and move within a predetermined distance. The slider 7 is urged by a slider spring 17 in the negative X direction. This enables the slider 7 to move from a withdrawn position at which the wipers 8 and 9 and the caps 1A and 1B are positioned away from the recording head 5 to a wiping position at which the wipers 8 and 9 can wipe the discharge orifice surfaces 51 and 52 of the recording head 5. This also enables the slider 7 to move to a capping position at which the caps 1A and 1B can cover the discharge orifice surfaces 51 and 52 of the recording head 5. The slider 7 has four projecting portions 7*b* projecting from the side walls of the slider 7 in the Y direction that intersects (in this case, orthogonally intersects) the moving direction of the carriage 6. Two projecting portions 7*b* projecting in the negative Y direction are shown in FIG. 4. The other two projecting portions 7*b* project in the positive Y direction. The four projecting portions 7*b* are in contact with respective slider cams 13*a* formed in a bottom body casing 13. When the slider 7 moves, the four projecting portions 7*b* move along respective cam surfaces of the slider cams 13*a* formed in the bottom body casing 13. This mechanism controls the height of the slider 7 such that the slider 7 assumes predetermined heights with respect to the discharge orifice surfaces 51 and 52 at positions along the movement path of the carriage (such as the withdrawn position, the wiping position, and the capping position).

The wiper 8 wipes the discharge orifice surface 51 of the multicolor recording head 5A, and the wiper 9 wipes the discharge orifice surface 52 of the black-color recording head 5B. Both of the wiper 8 and the wiper 9 are attached to the slider 7. The caps 1A and 1B for capping the discharge orifice surfaces 51 and 52 are attached to respective cap holders 2A and 2B. Each of the cap holders 2A and 2B is further attached to the slider 7 using four hooks. Cap springs are disposed between the slider 7 and respective cap holders 2A and 2B. The cap springs urge respective cap holders 2A and 2B (on which the caps 1A and 1B are mounted) in the positive Z direction toward the discharge orifice surfaces 51 and 52. The wipers 8 and 9 and the caps 1A and 1B are arranged in the order of the wiper 8, the cap 1A, the wiper 9, and the cap 1B from a recording region in the positive X direction.

Figure 5:
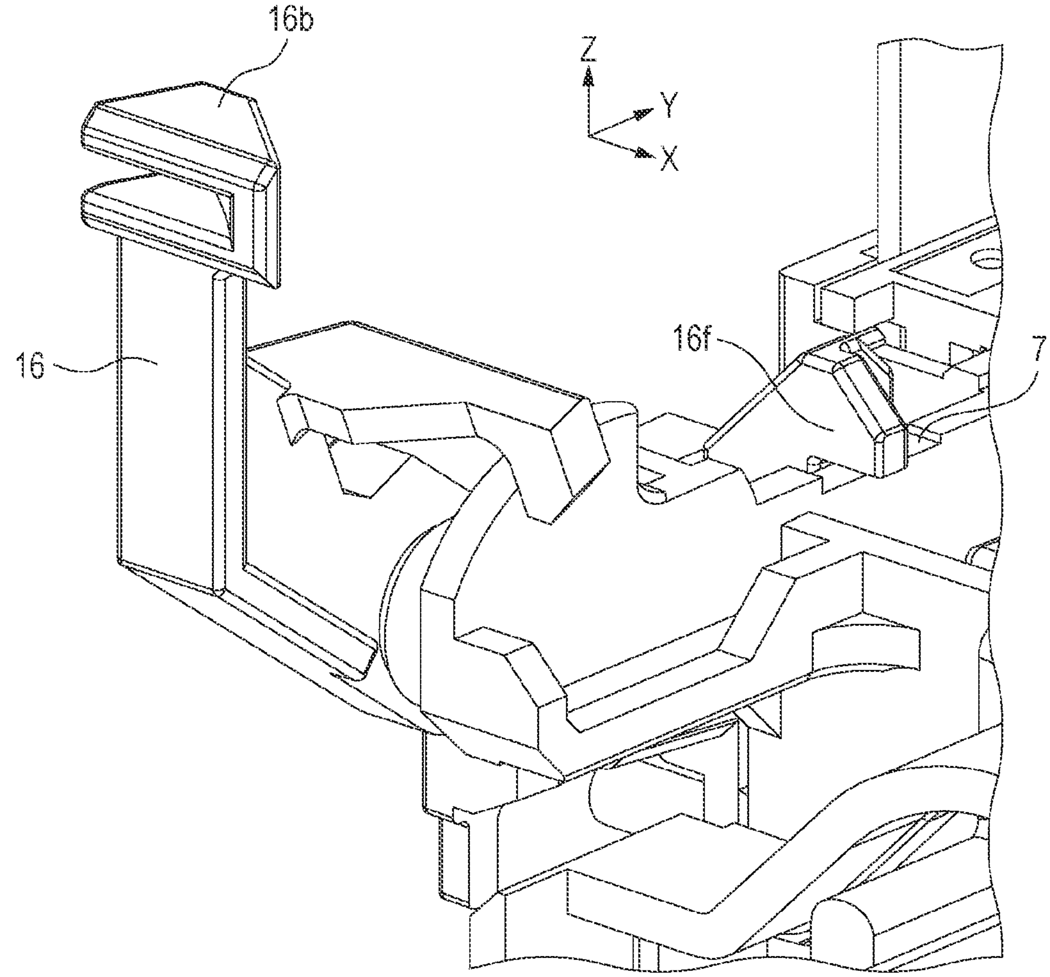
FIG. 5 is a perspective view illustrating a lock lever according to the embodiment.

As illustrated in FIG. 4, a lock lever 16 is attached to an end portion of the slider 7, the end portion facing the recording region and also facing downstream in the sheet conveyance direction (in the negative Y direction). The lock lever 16 is an engaging member that locks (engages) the slider 7 at the wiping position. The lock lever 16 rotatably attached to the slider 7 so as to assume an engagement position at which the slider 7 is locked at the wiping position and a release position at which the slider 7 is released. When the carriage 6 comes to the wiping position to wipe the discharge orifice surfaces 51 and 52 of the recording head 5, the lock lever 16 prevents slider 7 from moving in the negative X direction and also in the negative Z direction. The lock lever 16 is supported so as to be able to rotate on a plane parallel to the Y direction that intersects (orthogonally intersects, in this case) the moving direction of the carriage 6. The lock lever 16 has a support shaft 16*e* and is supported thereon so as to be able to rotate about the support shaft 16*e*. A torsion coil spring (not illustrated) is disposed so as to urge the lock lever 16 to rotate counterclockwise viewed from the –X direction side. The urging force of the torsion coil spring moves the lock lever 16 to a position at which the lock lever 16 is retained unless an external torque exceeding a predetermined value is applied to the lock lever 16. This position is the position at which a projecting portion 16*f* of the lock lever 16 abuts the slider 7 (see FIG. 5).

FIGS. 6A and 6B and FIGS. 7A and 7B are front views illustrating the recovery mechanism section in which the slider is positioned differently. An engaging portion 13*d* is provided at the apparatus body. The engaging portion 13*d* is configured to engage a tip end portion 16*a* of the lock lever 16 when the projecting portion 16*f* of the lock lever 16 abuts the slider 7.

Figure 6A:
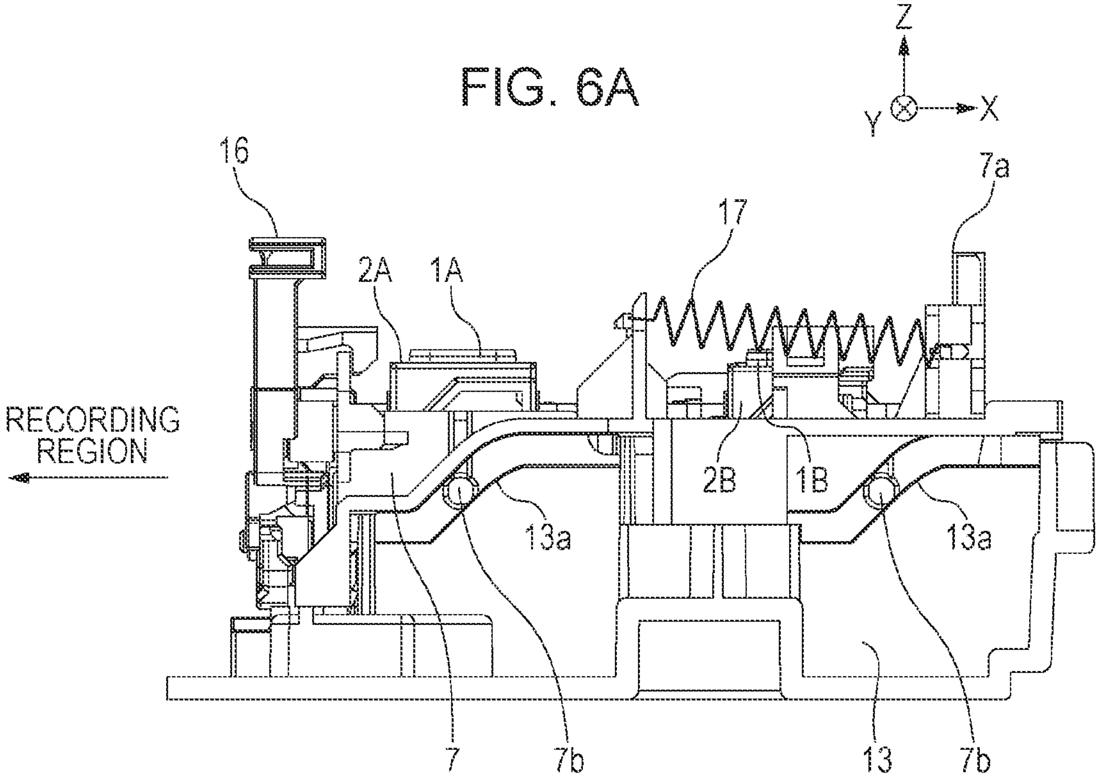
FIGS. 6A and 6B are views illustrating the recovery mechanism section according to the embodiment, in which a slider is positioned differently.

FIG. 6A illustrates a state of the recovery mechanism section 104 during wiping. The carriage 6 first moves in the positive X direction from the recording region. The carriage 6 subsequently abuts the abutting portion 7*a* and thereby moves the abutting portion 7*a* in the positive X direction, which causes the wipers 8 and 9 to move in the positive Z direction. The tip end portion 16*a* of the lock lever 16 engages the engaging portion 13*d* at the position illustrated in FIG. 6A, thereby fixing the positions of the wipers 8 and 9. In this state, when the carriage 6 moves toward the recording region, the wipers 8 and 9 move relative to the carriage 6 toward the discharge orifice surfaces (in the X direction) and wipe the discharge orifice surfaces. Thus, the wiping operation is performed.

Figure 6B:
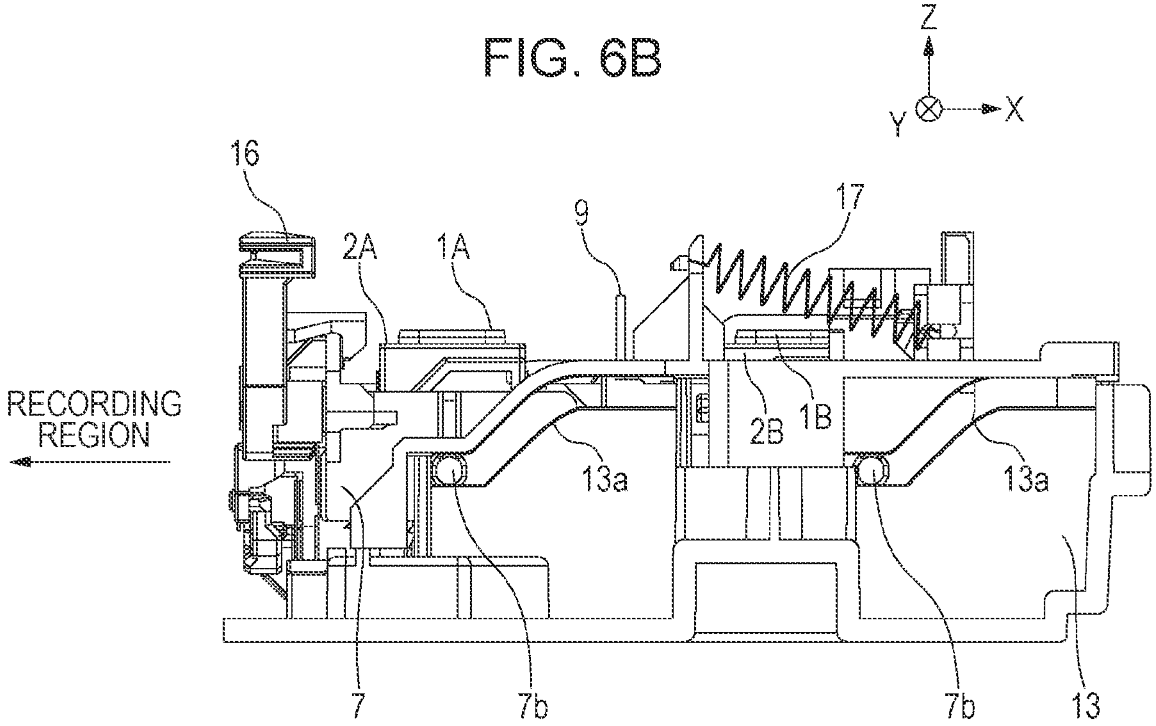

The carriage 6 moves toward the recording region during the wiping operation. The carriage 6 has a projecting portion 67 for unlocking the slider 7 (see FIG. 3). The projecting portion 67 is configured to about a top end portion 16*b* of the lock lever 16. When the carriage 6 moves toward the recording region, the projecting portion 67 for unlocking the slider 7 comes into contact with the top end portion 16*b* of the lock lever 16 and rotates the lock lever 16 clockwise as viewed from the recording region. This causes the tip end portion 16*a* of the lock lever 16 to move away from the engaging portion 13*d*, which releases the lock lever 16 from the engagement as illustrated in FIG. 6B. The wipers 8 and 9 moves in the negative Z direction and are detached from the carriage 6 and the recording head 5, which enables the carriage 6 to move toward the recording region to resume recording.

Figure 7A:
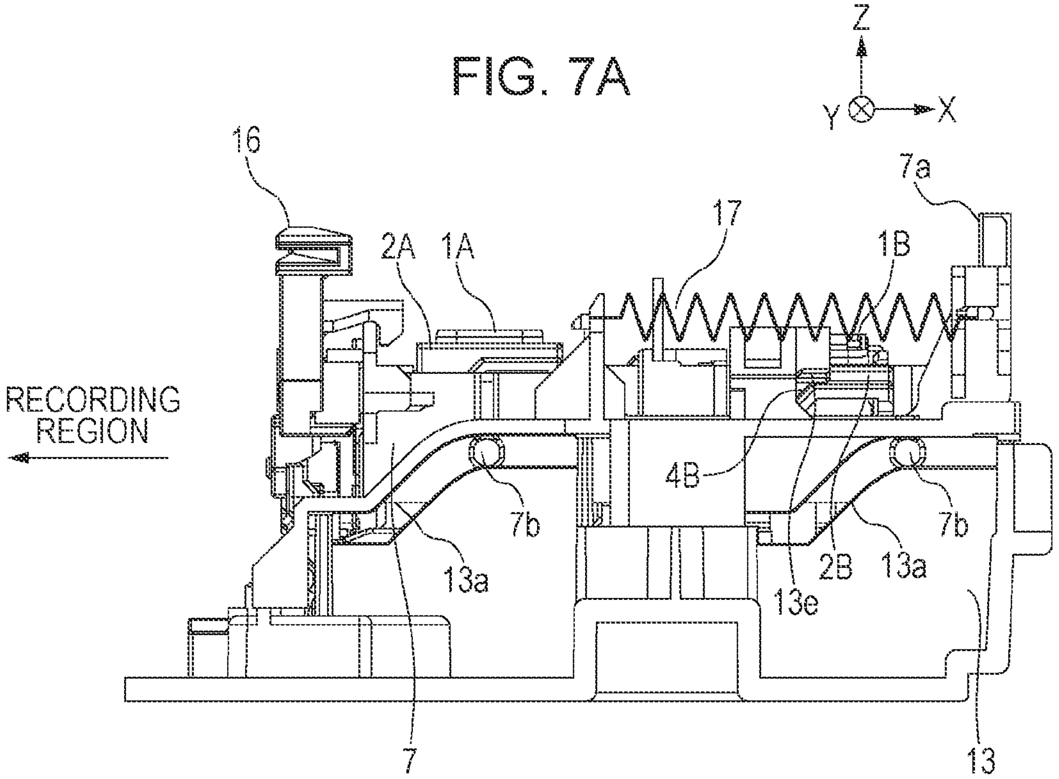
FIGS. 7A and 7B are views illustrating the recovery mechanism section according to the embodiment, in which the slider is positioned differently.

FIG. 7A illustrates a state in which the slider 7 assumes a single-head suction position. The cap holder 2B has a cap holder cam 4B disposed at a position facing downstream in the sheet conveyance direction. A cam 13*e* is formed at the apparatus body. The cam 13*e* is configured to engage the cap holder cam 4B when the slider 7 is at the single-head suction position. Accordingly, when the slider 7 is at the single-head suction position, the cam 13*e* abuts the cap holder cam 4B and pushes the cap holder cam 4B down, which lowers the cap 1B attached to the cap holder 2B.

As a result, the cap 1B ceases from capping, which leaves only the cap 1A capping the discharge orifice surface 51. When the slider 7 is at the single-head suction position, ink can be drawn from discharge orifices at the discharge orifice surface 51, which is capped by the cap 1A, by operating the pumping mechanism (not illustrated).

Figure 7B:
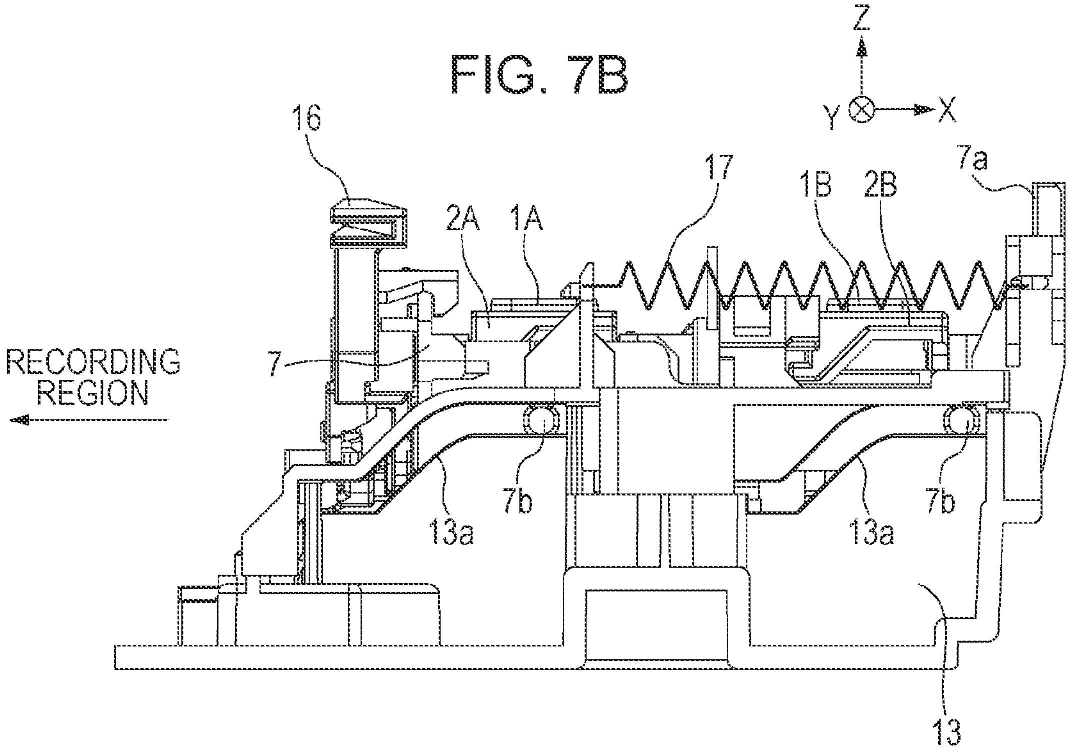

FIG. 7B illustrates a state in which the slider 7 assumes a position at which the cap 1A and the cap 1B can simultaneously cap the discharge orifice surface 51 and the discharge orifice surface 52. When the slider 7 is at the simultaneous capping position, ink can be drawn from discharge orifices at the discharge orifice surface 51, which is capped by the cap 1A, and also from discharge orifices at the discharge orifice surface 52, which is capped by the cap 1B, by operating the pumping mechanism.

Recording Head and Cap

Figure 8A:
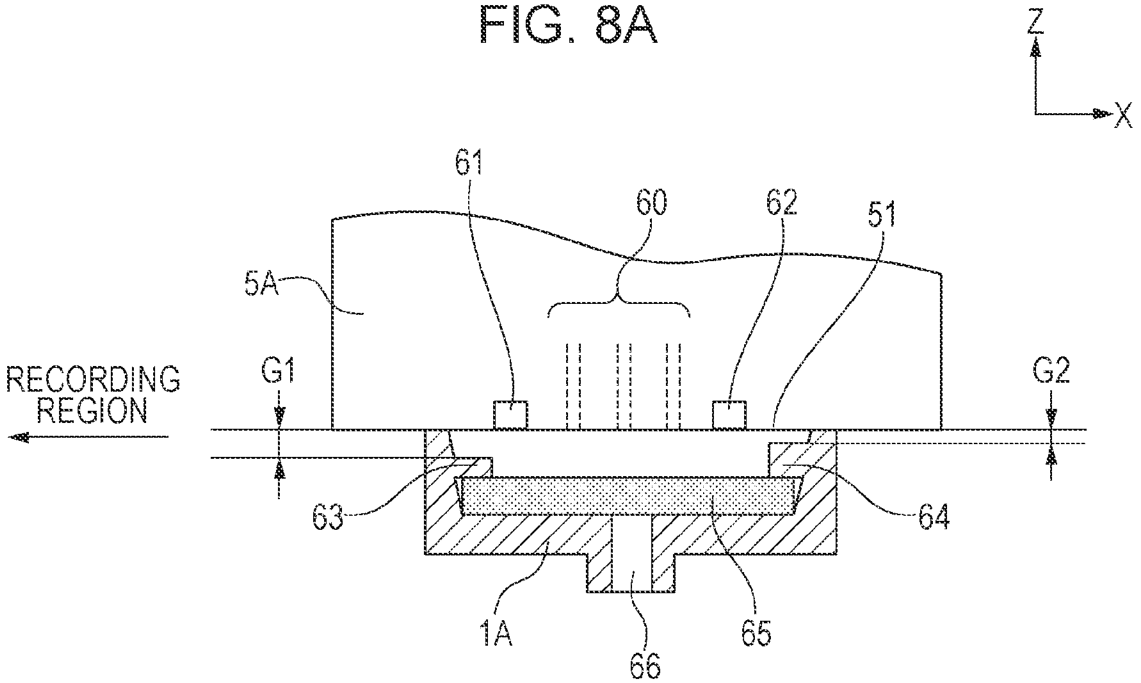
FIGS. 8A and 8B are views illustrating a structure of a cap according to the embodiment.
Figure 8B:
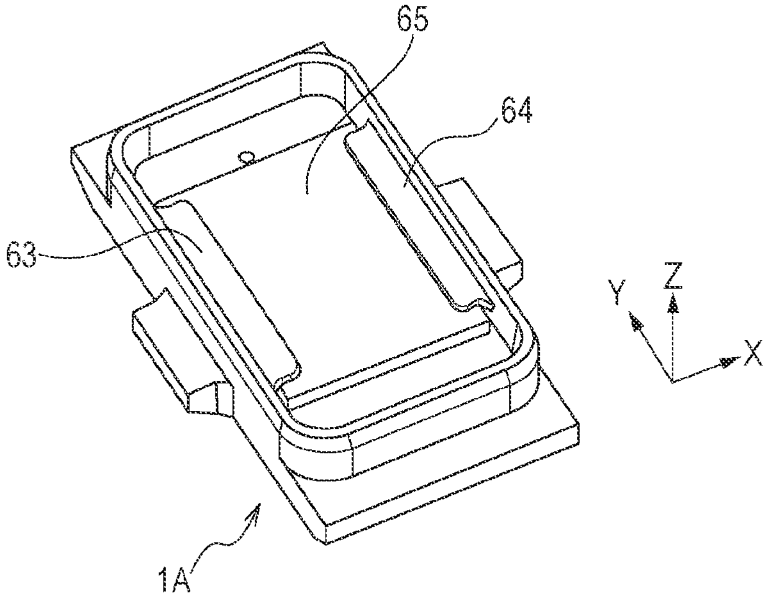

Next, the cap 1A will be described in detail. Note that the cap 1A and the cap 1B have the same structure, and the description of the cap 1B will be omitted. FIG. 8A is a schematic cross-sectional view of the recording head 5A and the cap 1A, the view being taken along line VIIIA-VIIIA in FIG. 4. FIG. 8B is a view illustrating an exterior of the cap 1A. A discharge orifice region 60 is formed in a central area of the discharge orifice surface 51 of the recording head 5A. In the discharge orifice region 60, multiple discharge orifice rows are disposed side by side in the X direction. Each discharge orifice row has multiple discharge orifices that are arranged in the Y direction. A first depression 61 and a second depression 62 are formed as step portions at the discharge orifice surface 51 so as to straddle the discharge orifice region 60. In the present embodiment, the first depression 61 and the second depression 62 are depressed from the discharge orifice surface 51 in a direction opposite to the direction of ink being discharged from the discharge orifices (in other words, depressed in the positive Z direction). The first depression 61 and the second depression 62 are formed in the manufacturing process of the recording head 5. In the manufacturing process, a chip having the discharge orifice region 60 in which the discharge orifices are formed is attached to the recording head 5A. The recording head 5A has a cavity that is formed to be larger than the chip so as to accommodate the chip. When the chip is mounted in the cavity of the recording head 5A, gaps generated around the chip are the first depression 61 and the second depression 62. Ink may enter the gaps during a suction operation. Accordingly, the gaps, or the first depression 61 and the second depression 62, are made as small as possible.

A cap absorber 65 formed of a porous material to absorb ink is disposed inside the cap 1A. A suction port 66 is formed at the bottom of the cap 1A. The suction port 66 is connected to a tube and a suction pump (not illustrated). The cap 1A has a first protrusion 63 and a second protrusion 64. The first protrusion 63 protrudes from an inside wall of the cap 1A, and the second protrusion 64 protrudes from another inside wall that opposes the inside wall from which the first protrusion 63 protrudes. The first protrusion 63 and the second protrusion 64 are shaped like cuboids. When the cap 1A covers the discharge orifice surface, the first protrusion 63 is positioned near a side of the discharge orifice region 60, the side facing in a direction opposite to the wiping direction (the positive X direction), and the second protrusion 64 is positioned near a side of the discharge orifice region 60, the side facing in the wiping direction. The first protrusion 63 and the second protrusion 64 prevent the absorber 65 from moving toward the discharge orifice surface (i.e., in the positive Z direction). The first protrusion 63 and the second protrusion 64 are formed so as to straddle the discharge orifice region 60 in the X direction when the cap 1A covers the discharge orifice surface 51 of the recording head 5A. In the Z direction (in the direction normal to the discharge orifice surface), a distance G2 between the second protrusion 64 and the discharge orifice surface 51 is smaller than a distance G1 between the first protrusion 63 and the discharge orifice surface 51.

Recovery Processing

Figure 9:
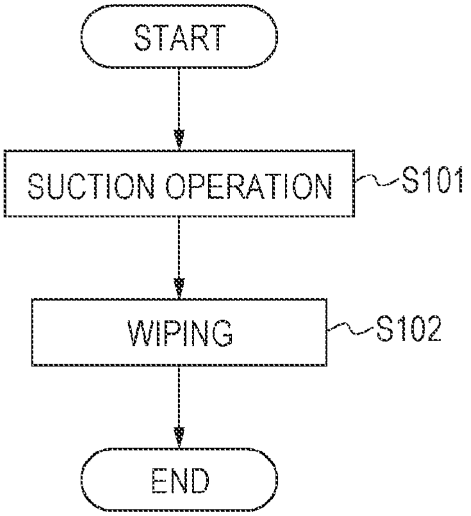
FIG. 9 is a flowchart of a recovery processing according to the embodiment.

Next, recovery processing will be described. FIG. 9 is a flowchart of the recovery processing. The recovery processing is performed when a user instructs the recovery processing through an operation panel (not illustrated) disposed in the recording apparatus or through the host computer in a case, for example, of a defect being found in printing results. The recovery processing is also performed when the period of non-recording exceeds a predetermined duration. MPU 201 executes the sequence of the recovery processing while MPU 201 controls operation of each unit in accordance with a program stored in ROM 202.

First, in step S101, the suction operation is performed. In the suction operation, the suction pump is operated to draw the ink inside the recording head 5 while the cap 1A and/or the cap 1B covers the recording head 5. Details will be described below with reference to FIG. 10.

Next, in step S102, the wiping operation is performed. Residual ink remains at the discharge orifice surfaces after the suction operation. The wipers 8 and 9 remove the residual ink by wiping the discharge orifice surfaces of the recording head 5. Details will be described below with reference to FIG. 11. The recovery processing is performed in this manner.

Figure 10A:
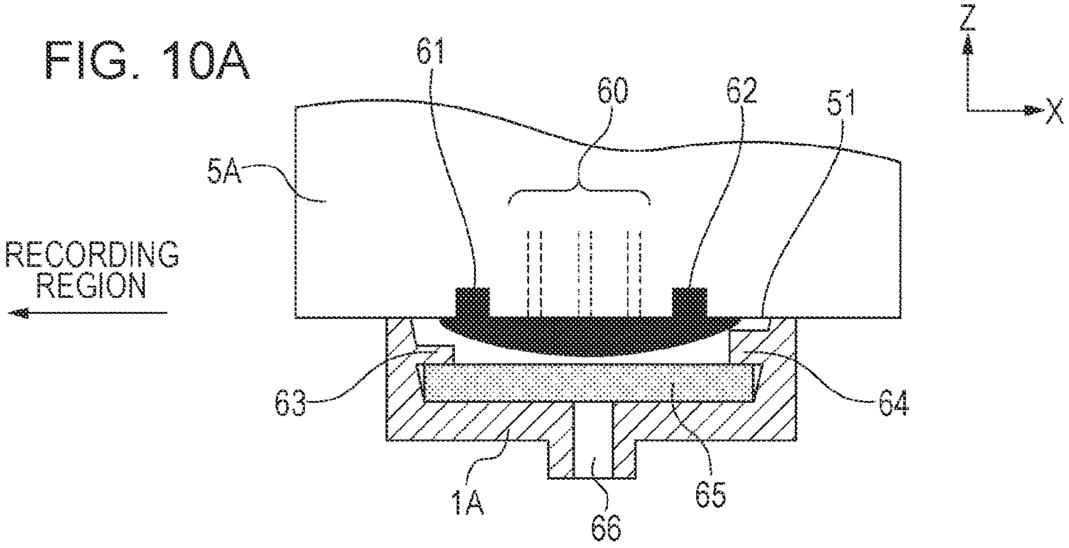
FIGS. 10A, 10B, and 10C are views illustrating a recording head and the cap during a suction operation according to the embodiment.
Figure 10B:
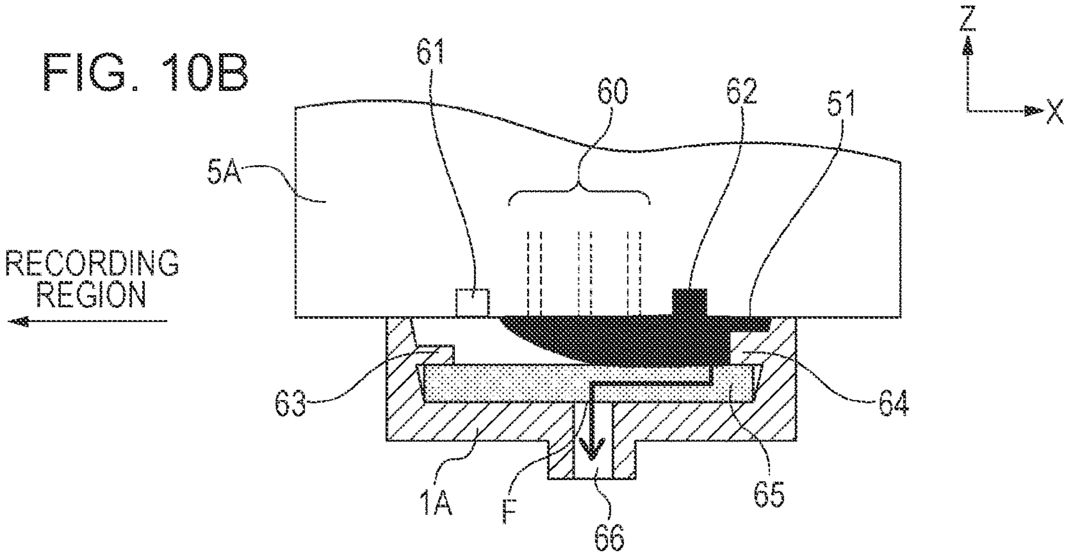
Figure 10C:
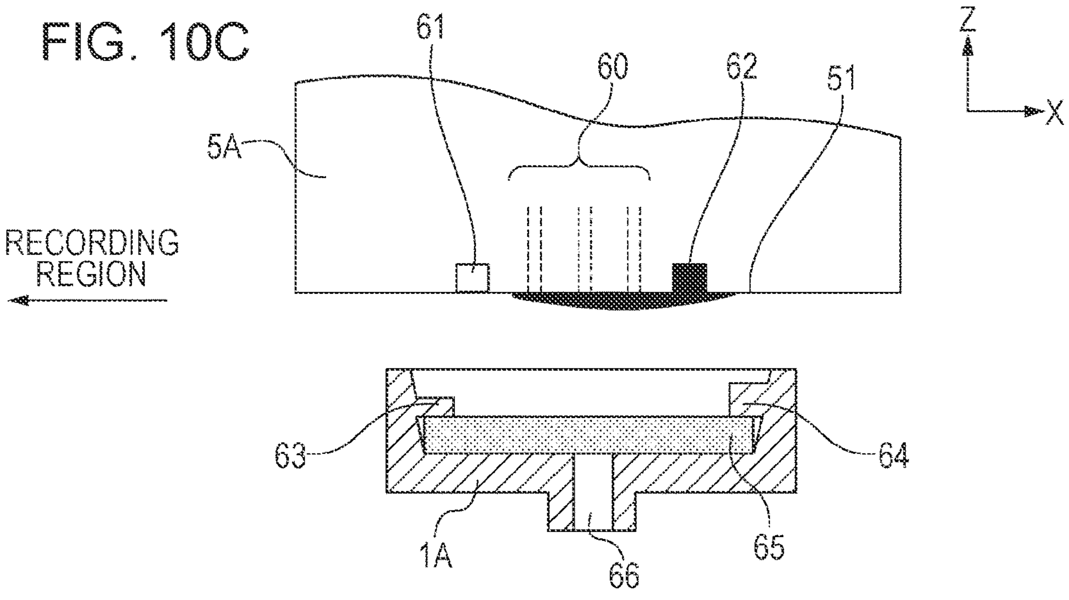

FIGS. 10A to 10C are schematic cross-sectional views illustrating the recording head 5A and the cap 1A during the suction operation, the views being taken along section X-X in FIG. 4. In the suction operation, the suction pump (not illustrated) is operated to draw ink while the cap 1A covers the discharge orifice region 60 of the recording head 5A. The operation of the suction pump applies negative pressure to the inside of the cap 1A, which draws the ink from the discharge orifices. Ink solids or dust or the like are removed from the discharge orifices to recover the discharge performance. Here, ink suction performance improves as the edges of the cap 1A are in closer contact with the discharge orifice surface 51.

FIGS. 10A and 10B illustrate states of the suction operation when the recovery mechanism section is in respective states illustrated in FIGS. 7A and 7B. FIG. 10A illustrates an initial state of the suction operation. Ink drawn from the discharge orifices in the discharge orifice region 60 spreads over the discharge orifice surface 51. The distance between the second protrusion 64 and the discharge orifice surface 51 is smaller than the distance between the first protrusion 63 and the discharge orifice surface 51. Accordingly, the drawn ink is in contact with the second protrusion 64. At this stage, the ink enters the first depression 61 and the second depression 62. FIG. 10B illustrate an intermediate state of the suction operation. After the drawn ink comes into contact with the second protrusion 64, the ink flows along the inside wall near the second protrusion 64 as indicated by ink flow F.

This flow of ink is caused due to the drawn ink coming into contact faster with the second protrusion 64 than with the first protrusion 63. Accordingly, the ink inside the first depression 61 flows along the second protrusion 64 from the discharge orifice surface 51 to the suction port 66 and the tube (not illustrated). FIG. 10C illustrates a state after the suction operation, in which the cap 1A is detached from the recording head 5A. Although ink is adhered to the discharge orifice region 60 and in the second depression 62, ink is almost not present in the first depression 61.

Wiping

Figure 11A:
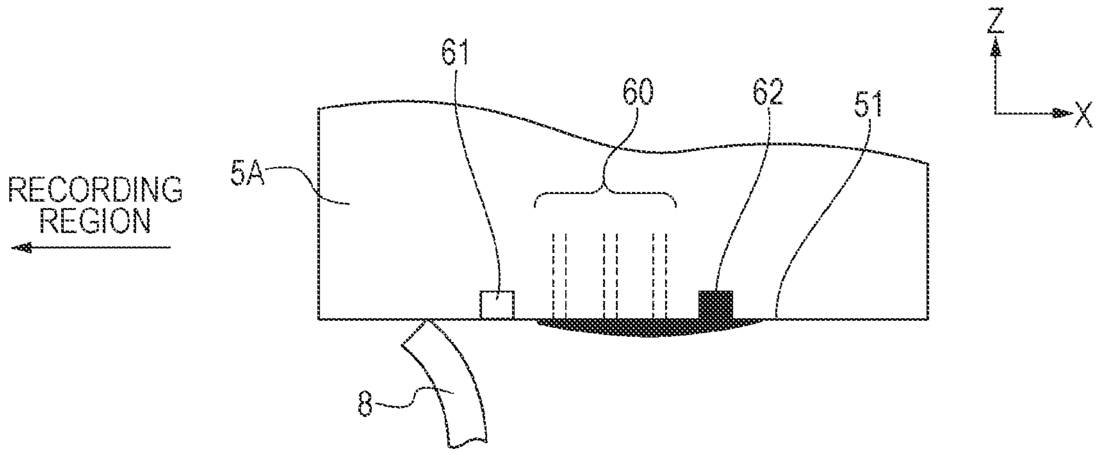
FIGS. 11A and 11B are views illustrating the recording head and the cap during a wiping operation according to the embodiment.
Figure 11B:
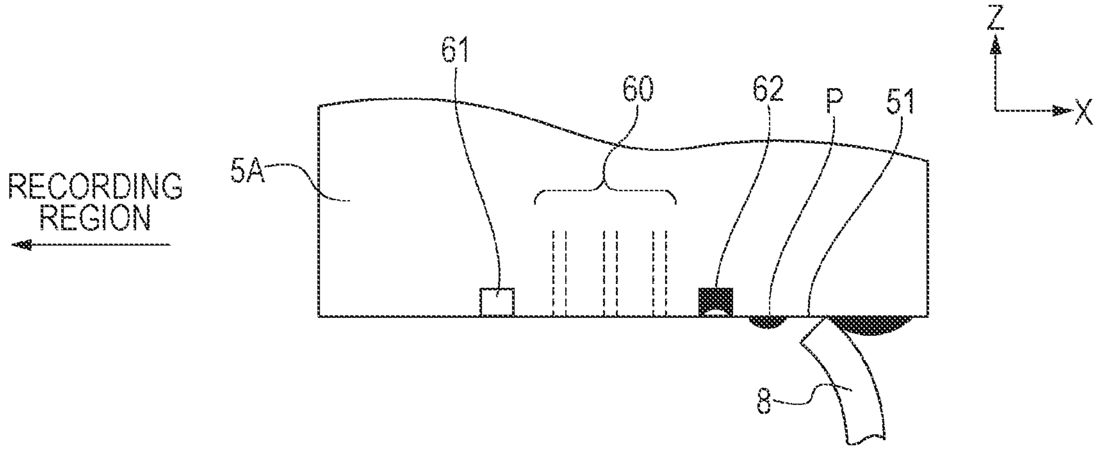

FIGS. 11A and 11B are schematic cross-sectional views illustrating states of the recording head 5A and the cap 1A during the wiping operation, the views being taken along section XI-XI in FIG. 4. The recording head 5A moves toward the recording region while the wiper 8 is in contact with the discharge orifice surface 51. FIG. 11A illustrates a state in which the wiper 8 is at the starting position of wiping relative to the discharge orifice region 60. In this state, the recovery mechanism is positioned as illustrated in FIG. 6A. FIG. 11B illustrates a state in which the wiper 8 is at the end position of wiping relative to the discharge orifice region 60. As illustrated in FIGS. 11A and 11B, while ink does not accumulate in the first depression 61, the wiping can wipe off the ink near the discharge orifice region 60, which can recover the discharge performance.

As illustrated in FIG. 11B, the second depression 62 has ink therein. When the wiper 8 comes beneath the second depression 62, the wiper 8 draws some ink out of the second depression 62. Subsequent wiper movement leaves the drawn ink on the discharge orifice surface 51 (i.e., remains as ink P). The ink P, however, is positioned sufficiently away from the discharge orifice region 60 and does not cause defective discharge that may occur due to the ink P coming into contact with the discharge orifice region 60.

Figure 12A:
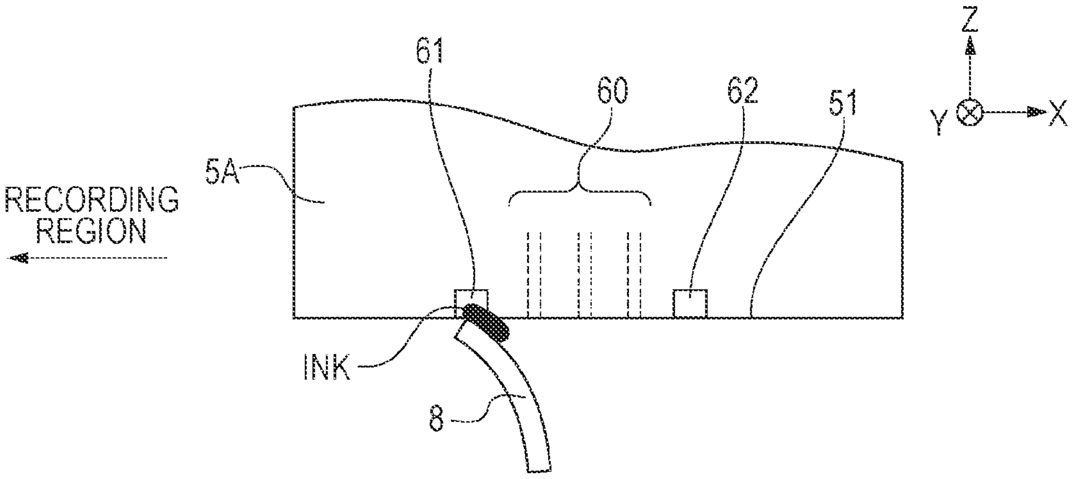
FIGS. 12A and 12B are views illustrating the wiping operation when ink is collected in a first depression.
Figure 12B:
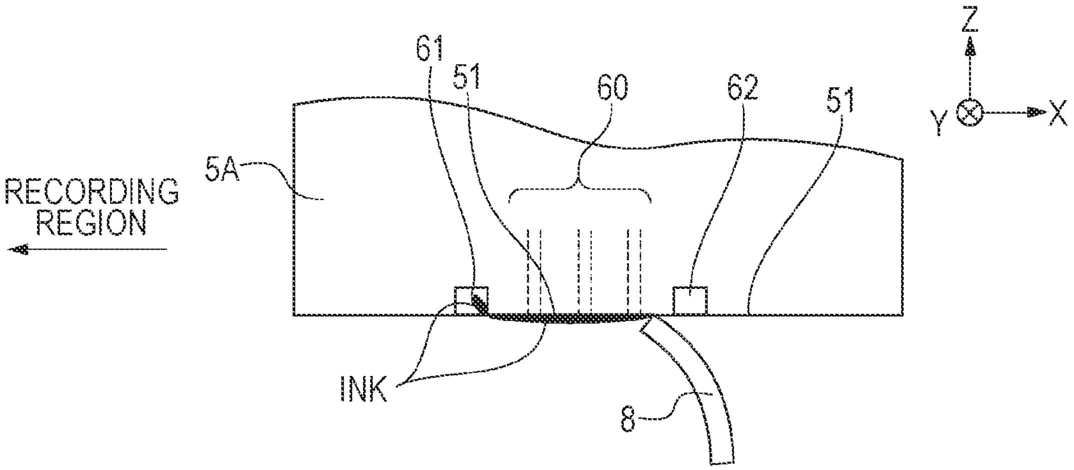

FIGS. 12A and 12B are views illustrating a case in which the wiping is performed while ink accumulates in the first depression 61. As illustrated in FIG. 12A, when the wiper 8 comes beneath the first depression 61, the wiper 8 draws some ink out of the first depression 61. The ink drawn from the first depression 61 is spread in the vicinity of the discharge orifice region 60 by the wiper 8 (FIG. 12B). The ink present in the vicinity of the discharge orifice region 60 as described above may lead to defective discharge, such as ink discharge in wrong directions or inability to discharge ink.

On the other hand, the prevention of ink from remaining in the first depression 61 during the suction operation, as described with reference to FIGS. 10A to 10C, further prevents ink from spreading in the vicinity of the discharge orifice region after the wiping, as illustrated in FIG. 11B, which reduces the likelihood of occurrence of defective discharge. In the present embodiment, the detailed description has been directed to the recording head 5A. Note that the recording head 5B has the same structure and can provide the same advantageous effects.

Other Embodiments

Figure 13:
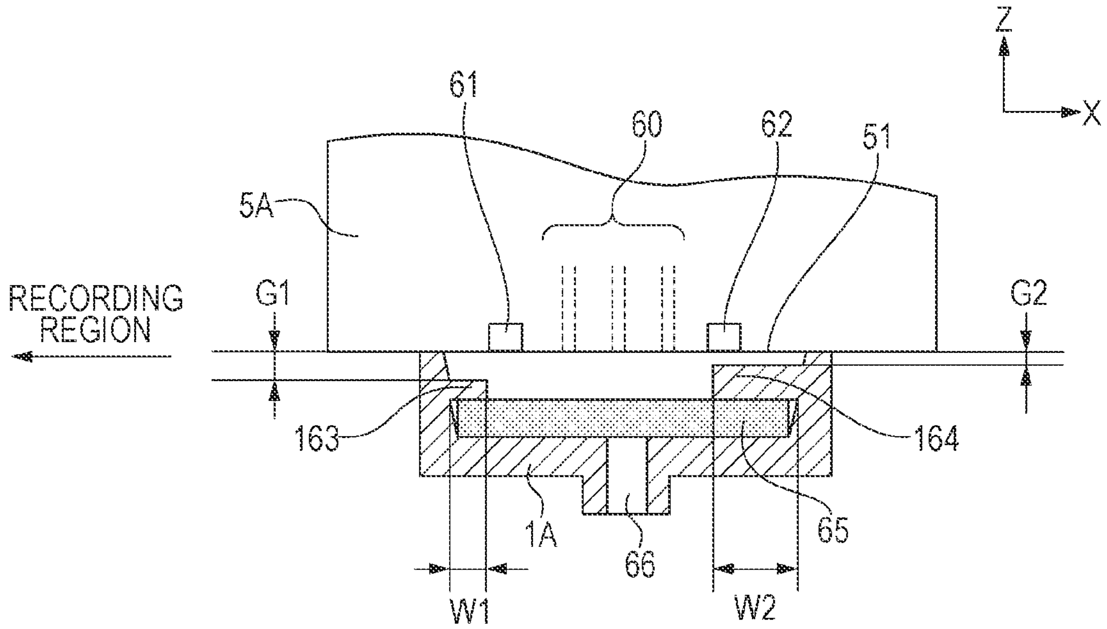
FIG. 13 is a view illustrating a structure of a cap according to another embodiment.

Next, other embodiments will be described. The description of elements similar to those described in the above embodiment will be omitted. FIG. 13 is a schematic cross-sectional view of a recording head and a cap according to another embodiment, the view being taken along line XIII-XIII in FIG. 4. The cap 1A has a first protrusion 163 and a second protrusion 164. The first protrusion 163 protrudes from an inside wall of the cap 1A, and the second protrusion 164 protrudes from another inside wall that opposes the inside wall with the discharge orifice region 60 being interposed therebetween. A length W2 of the second protrusion 164 protruding from the inside wall is greater than a length W1 of the first protrusion 163 protruding from the inside wall. Accordingly, the ink drawn from the discharge orifice region 60 by the suction operation tends to flow easily along the inside wall near the second protrusion 164. As a result, the wiping can be performed while ink does not accumulate much in the first depression 61. Accordingly, ink droplets do not spread readily to the discharge orifice region 60, which reduces the likelihood of occurrence of defective discharge. Note that advantageous effects can be obtained when the length W1<the length W2 even in the case of the distance G1 being equal to the distance G2 in the Z direction.

Figure 14:
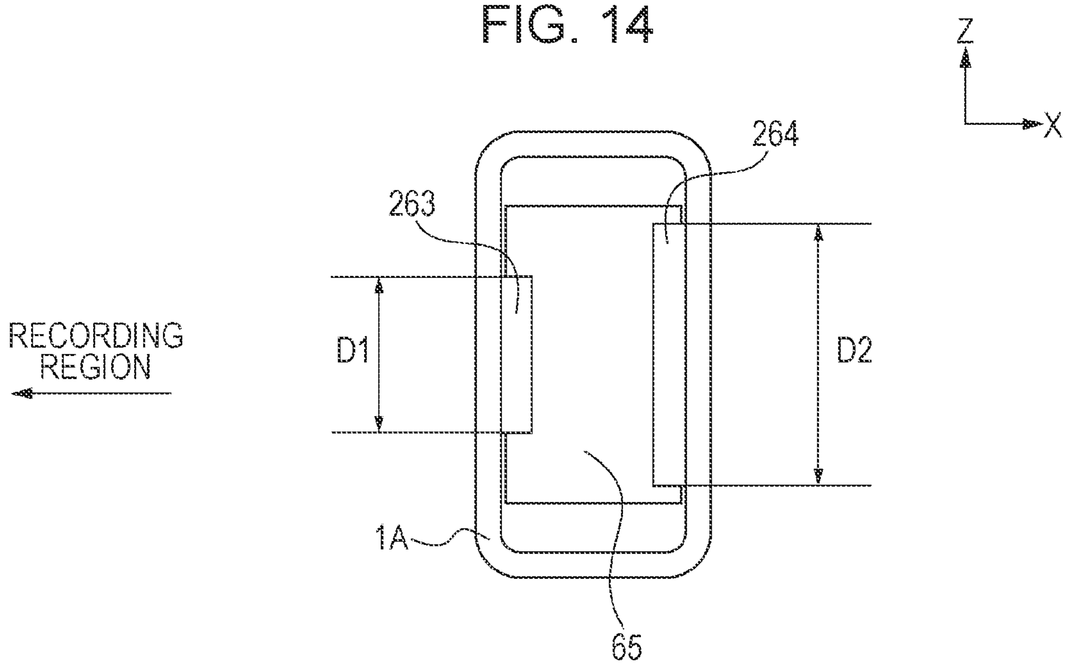
FIG. 14 is a view illustrating a structure of a cap according to another embodiment.

In another embodiment, the cap may be structured as illustrated in FIG. 14. FIG. 14 is a schematic top view of a cap. In this case, in the sheet conveyance direction (in the Y direction), a length D2 of a second protrusion 264 is set to be greater than a length D1 of a first protrusion 263. As a result, the ink drawn from the discharge orifice region 60 during the suction operation can flow readily along the inside wall near the second protrusion 264. In FIG. 14, the first protrusion 263 and the second protrusion 264 have the same length in the X direction. In this case, the length of the second protrusion 264 in the X direction may be extended, which causes ink to flow readily along the inside wall near the second protrusion 264. As is the case for the above embodiment, in the height direction (in the Z direction), the distance between the second protrusion 264 and the discharge orifice surface may be made smaller than the distance between the first protrusion 263 and the discharge orifice surface, which can achieve advantageous effects more readily.

In the above embodiments, the first protrusion and the second protrusion are provided. The shapes of these, however, need not be protrusions. A first member and a second member may be provided in the cap in place of the first protrusion and the second protrusion. The first member and the second member may have any shapes insofar as the distances of the first member and the second member from the discharge orifices are set to be the same as those described for the first protrusion and the second protrusion in the above embodiments. The first member and the second member may be shaped like columns or may have cross sectional shapes like trapezoids. The first member and the second member having the above distance arrangement can provide the same advantageous effects as those for the first protrusion and the second protrusion. The other arrangements, such as the lengths W1 and W2, are applicable to the first member and the second member as are the above embodiments.

As a result, the wiping can be performed while ink does not accumulate much in the first depression 61. Accordingly, ink droplets do not spread readily to the discharge orifice region 60, which reduces the likelihood of occurrence of defective discharge.

In the above embodiments, the wiping is performed with the wipers 8 and 9 remaining stationary and with the carriage 6 moving. The wiping, however, may be performed with the wipers 8 and 9 moving and the carriage 6 remaining stationary. Alternatively, both the wipers 8 and 9 and the carriage 6 may move during wiping.

In the above embodiments, the depressions extend in the Y direction, and the wipers wipes in the X direction. In the above embodiments, however, the depressions may extend in the X direction, and the wipers may wipe in the Y direction, which provides the same advantageous effects.

In the above embodiments, ink accumulates in portions depressed from the surface facing the platen. The above embodiments, however, may be applied to the case in which the surface facing the platen has projections since ink also accumulates at the projections.

In the above embodiments, the step portions that ink enters are formed at both sides of the discharge orifice region 60 in the main scanning direction (X direction), and the wiping is performed while the wipers and the carriage move relative to each other in the X direction. The step portions, however, may be formed, for example, at both sides of the discharge orifice region 60 in the sub scanning direction (Y direction), and the wiping may be performed while the wiper and the carriage move relative to each other in the Y direction.

According to the present embodiment, the ink accumulating at the step portion of the discharge orifice surface of the recording head can be prevented from adhering in the vicinity of the discharge orifices during wiping.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-158442, filed Sep. 28, 2021, which is hereby incorporated by reference herein in its entirety.

What is claimed is:

1. A recording apparatus comprising:

a recording head having a discharge orifice surface at which discharge orifices for discharging ink are arranged in a region;

a cap configured to cover the discharge orifice surface and including a first member and a second member;

a wiper configured to wipe the discharge orifice surface; and a moving unit configured to move the wiper and the recording head relative to each other in such a manner that the wiper moves relative to the recording head along the discharge orifice surface in a first direction, wherein, when the cap covers the discharge orifice surface, athe first member projects along the first direction from an inside wall of the cap at a position near a first side of the region having the discharge orifices in the discharge orifice surface, where the first side faces in a direction opposite to the first direction, wherein, when the cap covers the discharge orifice surface, the second member projects along the first direction towards the first member from another inside wall of the cap at a position near a second side of the region having the discharge orifices, where the second side faces in the first direction, and wherein, in a direction normal to the discharge orifice surface, a second distance between the second member and the discharge orifice surface is smaller than a first distance between the first member and the discharge orifice surface.

2. The recording apparatus according to claim 1, wherein the cap includes an absorber to absorb ink, and wherein the first member and the second member are configured to prevent the absorber from moving toward the discharge orifice surface.

3. The recording apparatus according to claim 1, wherein a length of the second member in the first direction is longer than a length of the first member in the first direction.

4. The recording apparatus according to claim 1, wherein in the first direction, a distance between the second member and the region having the discharge orifices is greater than a distance between the first member and the region having the discharge orifices.

5. The recording apparatus according to claim 1, wherein the second member is longer than the first member in a direction intersecting the first direction.

6. The recording apparatus according to claim 1, further comprising a suction unit configured to draw ink from the discharge orifices, wherein a wiping operation in which the wiper wipes the discharge orifice surface is performed after a suction operation in which the suction unit draws ink from the discharge orifices is performed.

7. The recording apparatus according to claim 6, wherein the suction operation and the wiping operation are performed in response to an instruction issued by a user.

8. The recording apparatus according to claim 6, wherein the suction operation and the wiping operation are performed when a period of non-recording of the recording head exceeds a predetermined duration.

9. The recording apparatus according to claim 1, wherein the first member and the second member are shaped like cuboids.

10. The recording apparatus according to claim 1, wherein the recording head has a step portion formed of at least one of a projection projected from the discharge orifice surface or a depression depressed from the discharge orifice surface, wherein the step portion is formed at the discharge orifice surface and at a position outside the region having the discharge orifices, and wherein the wiper wipes the recording head in the first direction while the moving unit moves the wiper and the recording head relative to each other in such a manner that the wiper passes over the step portion and subsequently passes over the region having the discharge orifices.

11. The recording apparatus according to claim 1, wherein, in performing a suction operation in which ink is drawn from the discharge orifices in the region, the ink contacts the second member before contacting the first member due to the second distance being smaller than the first distance and, as a result, the ink is drawn from the position near the first side of the region towards the position near the second side of the region, thereby lessening an amount of ink that can be wiped by the wiper from the position near the first side onto the discharge orifices in the region during a subsequent wiping operation.

12. The recording apparatus according to claim 11, wherein the recording head has a step portion formed of at least one of a projection projected from the discharge orifice surface or a depression depressed from the discharge orifice surface, and wherein, in performing the suction operation, ink is drawn from the step portion towards the position near the second side of the region, thereby lessening an amount of ink that can be wiped by the wiper from the step portion onto the discharge orifices in the region during the subsequent wiping operation.

13. A recording apparatus comprising:

a recording head having a step portion and a discharge orifice surface at which discharge orifices for discharging ink are arranged, wherein the step portion is formed of at least one of a projection projected from the discharge orifice surface or a depression depressed from the discharge orifice surface, and is formed at the discharge orifice surface and at a position outside a region having the discharge orifices;

a cap configured to cover the discharge orifice surface and including a first member and a second member;

a wiper configured to wipe the discharge orifice surface; and a moving unit configured to move the wiper and the recording head relative to each other in such a manner that the wiper moves relative to the recording head along the discharge orifice surface in a first direction, wherein the wiper is configured to wipe the recording head in the first direction from the step portion toward the region having the discharge orifices while the moving unit moves the wiper and the recording head relative to each other, wherein, when the cap covers the discharge orifice surface, the first member projects along the first direction from an inside wall of the cap at a position near a first side of the region having the discharge orifices, where the first side faces in a direction opposite to the first direction, wherein, when the cap covers the discharge orifice surface, the second member projects along the first direction towards the first member from another inside wall of the cap at a position near a second side of the region having the discharge orifices, where the second side faces in the first direction, and wherein the second member is longer than the first member in the first direction.

14. The recording apparatus according to claim 13, wherein the first member and the second member are shaped like cuboids.

15. The recording apparatus according to claim 13, wherein the wiper wipes the recording head in the first direction while the moving unit moves the wiper and the recording head relative to each other in such a manner that the wiper passes over the step portion and subsequently passes over the region having the discharge orifices.

16. A recording apparatus comprising:

a recording head having a step portion and a discharge orifice surface at which discharge orifices for discharging ink are arranged, wherein the step portion is formed of at least one of a projection projected from the discharge orifice surface or a depression depressed from the discharge orifice surface, and is formed at the discharge orifice surface and at a position outside a region having the discharge orifices;

a cap configured to cover the discharge orifice surface and including a first member and a second member;

a wiper configured to wipe the discharge orifice surface; and a moving unit configured to move the wiper and the recording head relative to each other in such a manner that the wiper moves relative to the recording head along the discharge orifice surface in a first direction, wherein the wiper is configured to wipe the recording head in the first direction from the step portion toward the region having the discharge orifices while the moving unit moves the wiper and the recording head relative to each other, wherein, when the cap covers the discharge orifice surface, the first member projects along the first direction from an inside wall of the cap at a position near a first side of the region having the discharge orifices, where the first side faces in a direction opposite to the first direction, wherein, when the cap covers the discharge orifice surface, the second member projects along the first direction towards the first member from another inside wall of the cap at a position near a second side of the region having the discharge orifices, where the second side faces in the first direction, and wherein the second member is longer than the first member in a direction intersecting the first direction.

17. The recording apparatus according to claim 16, wherein the first member and the second member are shaped like cuboids.

18. The recording apparatus according to claim 16, wherein the wiper wipes the recording head in the first direction while the moving unit moves the wiper and the recording head relative to each other in such a manner that the wiper passes over the step portion and subsequently passes over the region having the discharge orifices.

* * * * *